(12) United States Patent
Dock et al.

(10) Patent No.: US 10,526,078 B2
(45) Date of Patent: *Jan. 7, 2020

(54) TRACKER AND VIBRATION ANALYSIS SYSTEM HAVING UV SENSITIVITY

(71) Applicant: RPX Technologies, Inc., Stillwater, OK (US)

(72) Inventors: Matthew Dock, Stillwater, OK (US); Michael Fox, Stillwater, OK (US)

(73) Assignee: RPX Technologies, Inc., Stillwater, OK (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/701,031

(22) Filed: Sep. 11, 2017

(65) Prior Publication Data

US 2018/0072405 A1   Mar. 15, 2018

Related U.S. Application Data

(60) Provisional application No. 62/385,609, filed on Sep. 9, 2016.

(51) Int. Cl.
*B64C 27/00* (2006.01)
*G02B 5/22* (2006.01)
*G01B 11/16* (2006.01)

(52) U.S. Cl.
CPC ............ *B64C 27/008* (2013.01); *G01B 11/16* (2013.01); *G02B 5/22* (2013.01)

(58) Field of Classification Search
CPC ............ B64C 27/008; B64F 5/60; G01H 9/00
See application file for complete search history.

(56) References Cited

U.S. PATENT DOCUMENTS 9,815,565 B1 *  11/2017  Fox .................... G01C 21/165

* cited by examiner

Primary Examiner — Thanh Luu
(74) Attorney, Agent, or Firm — Dunlap Codding, P.C.

(57) ABSTRACT

Tracker systems are disclosed, the system mountable on a device having one or more rotary component, comprising: an optical tracker having circuitry that causes the optical tracker to receive and filter optical signals including UV, visible, and infrared wavelengths so as to be more sensitive to UV wavelengths than the visible and infrared wavelengths. The optical tracker having circuitry transmitting data indicative of a distance; and one or more computer processor that utilizes the optical tracker determined distance to determine track error of the one or more rotary component of the device, and transmits data indicative of the track error.

16 Claims, 8 Drawing Sheets

TRACKER AND VIBRATION ANALYSIS SYSTEM HAVING UV SENSITIVITY

INCORPORATION BY REFERENCE

The present patent application claims priority to the provisional patent application identified by U.S. Ser. No. 62/385,609 filed on Sep. 9, 2016, the entire content of which is hereby incorporated by reference.

FIELD OF THE DISCLOSURE

The disclosure generally relates to systems for rotation trackers and vibration analyses. More particularly the disclosure relates to systems and methods for tracking one or more rotating component of a body in order to measure the displacement of the rotating component and correct such displacement. Further, the disclosure relates to systems and methods for vibration analyses and vibration reduction of equipment having one or more rotating components.

BACKGROUND

Vibration reduction is an important part of performance enhancement for machines having rotating components. For example, helicopter vibration reduction is an important part of aircraft maintenance and ride quality.

Traditionally, such vibration is reduced by controlling the mass of the rotors and the aerodynamic effect of the rotor blades. For example, the mass error of a helicopter rotor is typically detected using a single accelerometer mounted near the rotor mast. The aerodynamic error in forward flight is usually detected by measuring the vertical "hop" in an accelerometer mounted in the nose of the helicopter. However, since vibration is a convolution of multiple vibration sources such as mass error, track error and other contributing factors such as leading or lagging blades, it is useful to measure blade track and airframe vibration in multiple axes simultaneously to help determine what type of mass or aerodynamic adjustment can best reduce the overall vibration.

There are several traditional methods for checking the track of helicopter rotor blades in a hover. For example, one method uses a flag on a stick that is positioned near the rotors. As the rotors pass the flag, the blade tips strike the flag, leaving marks that show the relative position of the blades. This method can be time consuming and dangerous to the operator. Another method uses reflective blade tips or illuminated blade tips to make the tips of the blades viewable under certain lighting conditions. In yet another method, strobe lights are used to visualize the blades movement and track.

In another example, an optical blade tracker is used to detect the distance of individual blades using a parallax method. Such a method is described in U.S. Pat. No. 5,929,431, which is hereby incorporated in its entirety herein. In that system, two sensors are used to generate two optical detection fields. As the blade passes through the two detection fields, the time is measured between the interruptions of the two fields. If the rotor diameter, RPM, and chord of the blades are known, then the distance, and difference in distance can be calculated, the track error calculated, and corrections can be made to adjust the rotor.

However, in some current systems, the optical blade tracker is not always perpendicular to the rotor blades and adjustment calculations must be done to compensate for the angular error in the position of the optical tracker. For instance, the distance that the optical blade tracker is mounted below the rotor, the distance ahead of the main rotor, and the angle looking up toward the rotor, are all measurements that need to be determined prior to operating the optical blade tracker. This measurement of distances and angles can be problematic and time consuming. Errors in the measurements may cause errors in the track estimate and the rotor smoothing.

Additionally, current systems require attachment of multiple accelerometers around the airship, as well as one at the mast and one at the nose, and then running wires back to a central computer from each accelerometer for vibration analysis. These multiple accelerometers are located to maximize the translational vibration in the accelerometer. However, the attachment and complexity of the wiring systems can be problematic, as well as time consuming to attach and maintain.

SUMMARY

Tracker and vibration analysis systems for equipment having at least one blade are described. The problem of dangerous, time-consuming, and inefficient, tracker correction is addressed through including an orientation/motion sensor in the tracker system such that the tracker system can determine the angle from the sensor to the blade. In the case of a helicopter, the blade is a rotor supported by a mast. With the angle, the RPM of the rotor blades, and the blade chord, the tracker system can calculate the position of the optical tracker relative to the blade(s). The tracker system can calculate the maximum deflection of the blade(s) at a blade tip. Further the problem of time-consuming and inefficient vibration data collection is addressed through use of centralized accelerometer(s) with which the tracker system can determine the vibration profile for the equipment.

In one embodiment, all of the sensors of the tracker system are attached to and/or supported by a housing that can be attached to the equipment such that the blade is within a field of view of the optical tracker.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

The following detailed description refers to the accompanying drawings. The same reference numbers in different drawings may identify the same or similar elements.

The mechanisms proposed in this disclosure circumvent the problems described above. The present disclosure describes systems and methods for tracking one or more rotating component of a body in order to measure the displacement of the rotating component and correct such displacement. Further, the disclosure relates to systems and methods for vibration analyses of equipment having one or more rotating components which may be referred to herein as a blade.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" (also represented as the symbol "/") refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
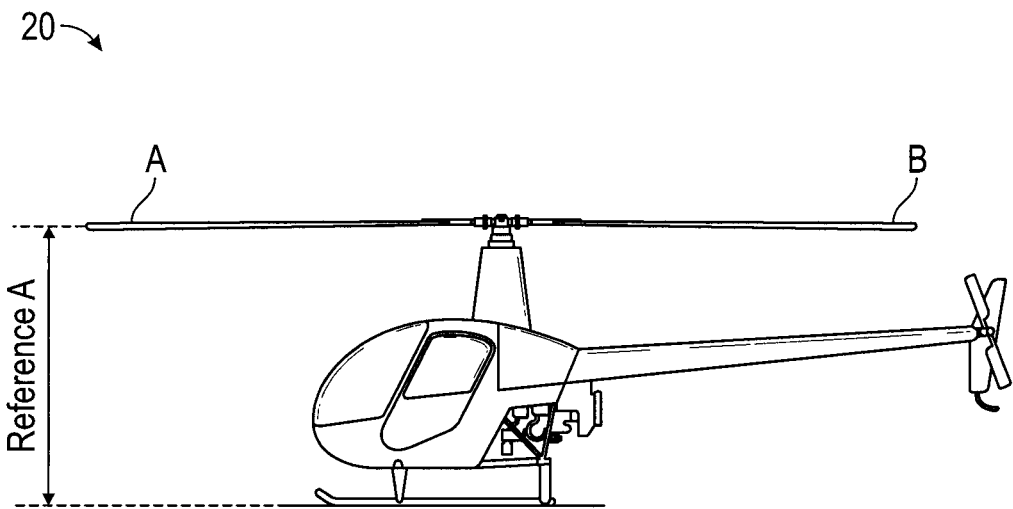
FIG. 1 is a side view of an exemplary helicopter with blades in a first position.
Figure 2:
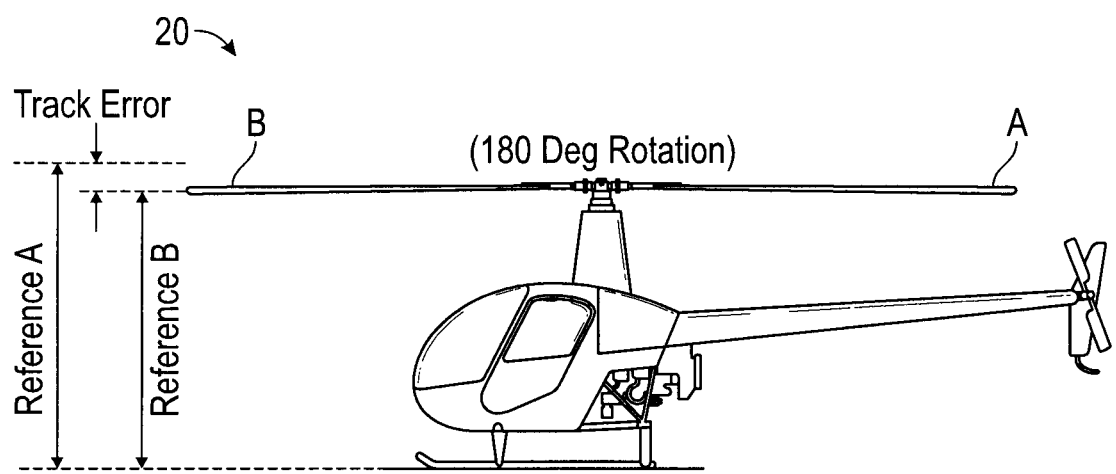
FIG. 2 is another side view of the exemplary helicopter of FIG. 1, with blades in a second position.

The systems disclosed herein may be used with any equipment having one or more rotary components. However, for clarity and simplicity, an exemplary piece of equipment in the form of a helicopter will be used for illustration. Referring now to the figures, FIGS. 1 and 2 illustrate an exemplary helicopter 20 having two or more blades, and shown with Blade A and Blade B for simplification. In FIG. 1, Blade A is shown in position 1 with a distance of Reference A from Blade A to the ground, and Blade B is shown in position 2.

As shown in FIG. 2, the Blades A and B may be rotated 180 degrees, such that Blade B is in position 1 and Blade A is in position 2. In an ideal balanced helicopter 20, when Blade B is in position 1, a distance of Reference B from Blade B to the ground would be equal to the distance Reference A from Blade A to the ground (such that Blade B "tracks" the position of Blade A). However, as illustrated in FIG. 2, when Blade B does not track Blade A, there is a "track error." The track error may be quantified, for example, as the difference between Reference A and Reference B. However, any fixed reference datum to the Blades A and B may be used to calculate track error, as track error is the difference between the track of Blade A and the track of Blade B.

Figure 3:
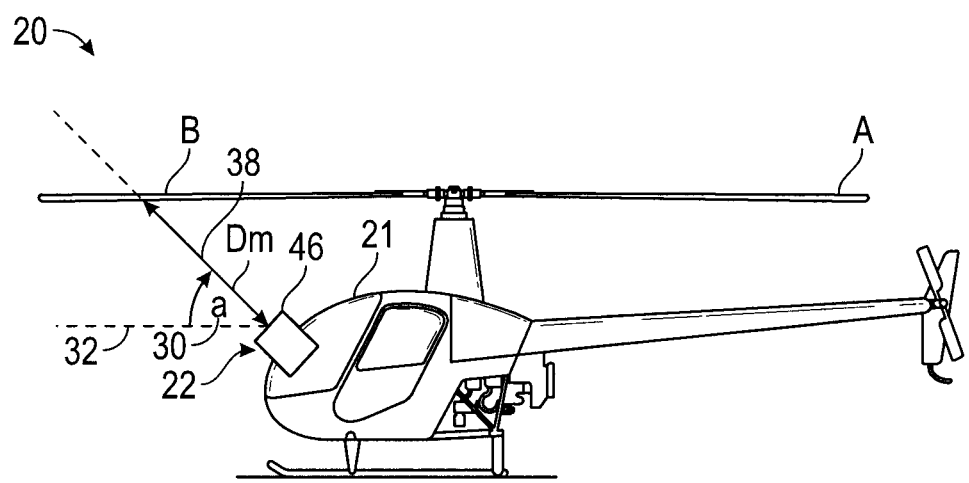
FIG. 3 is a side view of the helicopter of FIG. 2 with an exemplary tracker system having an optical tracker in accordance with the present disclosure.
Figure 3A:
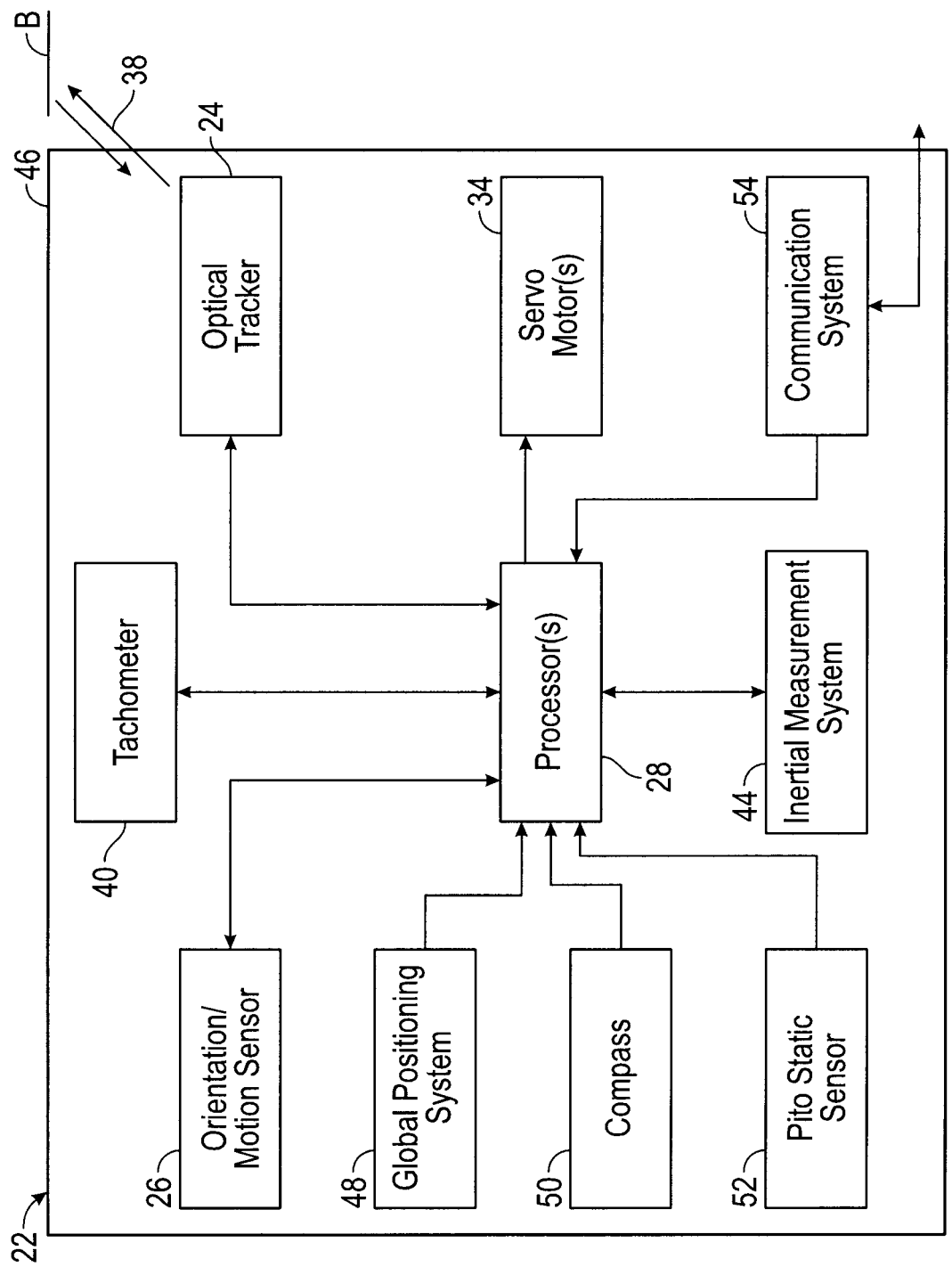
FIG. 3A is a block diagram of an exemplary optical tracker in accordance with the present disclosure for measuring at least one vibration parameter of a blade in accordance with the present disclosure.

In FIG. 3, helicopter 20 is shown with an exemplary tracker system 22 in accordance with the present disclosure. FIG. 3A shows a block diagram of the exemplary tracker system 22. The tracker system 22 may be mounted to the windscreen 21 of the helicopter 20, or in any suitable location with a line of sight to one or more blade, such as Blade A and/or B. In one example, the tracker system 22 utilizes suction cups to attach to windscreen 21.

The tracker system 22 comprises an optical tracker 24 and an orientation/motion sensor 26. The tracker system 22 may comprise one or more computer processors 28 (not shown). The optical tracker 24 can measure the distance Dm from the optical tracker 24 to the blade, for example, the distance Dm from the optical tracker 24 to Blade B, as shown. As is well known in the art, the optical tracker 24 interprets one or more optical signals 38. In one embodiment, the optical tracker 24 has a phototransmitter that transmits one or more optical signals 38 which deflect off a surface of the Blade A or Blade B and are received back by the optical tracker 24. By measuring the time for the one or more optical signal 38 to be sent and received back, the distance traveled can be calculated.

Figure 10:
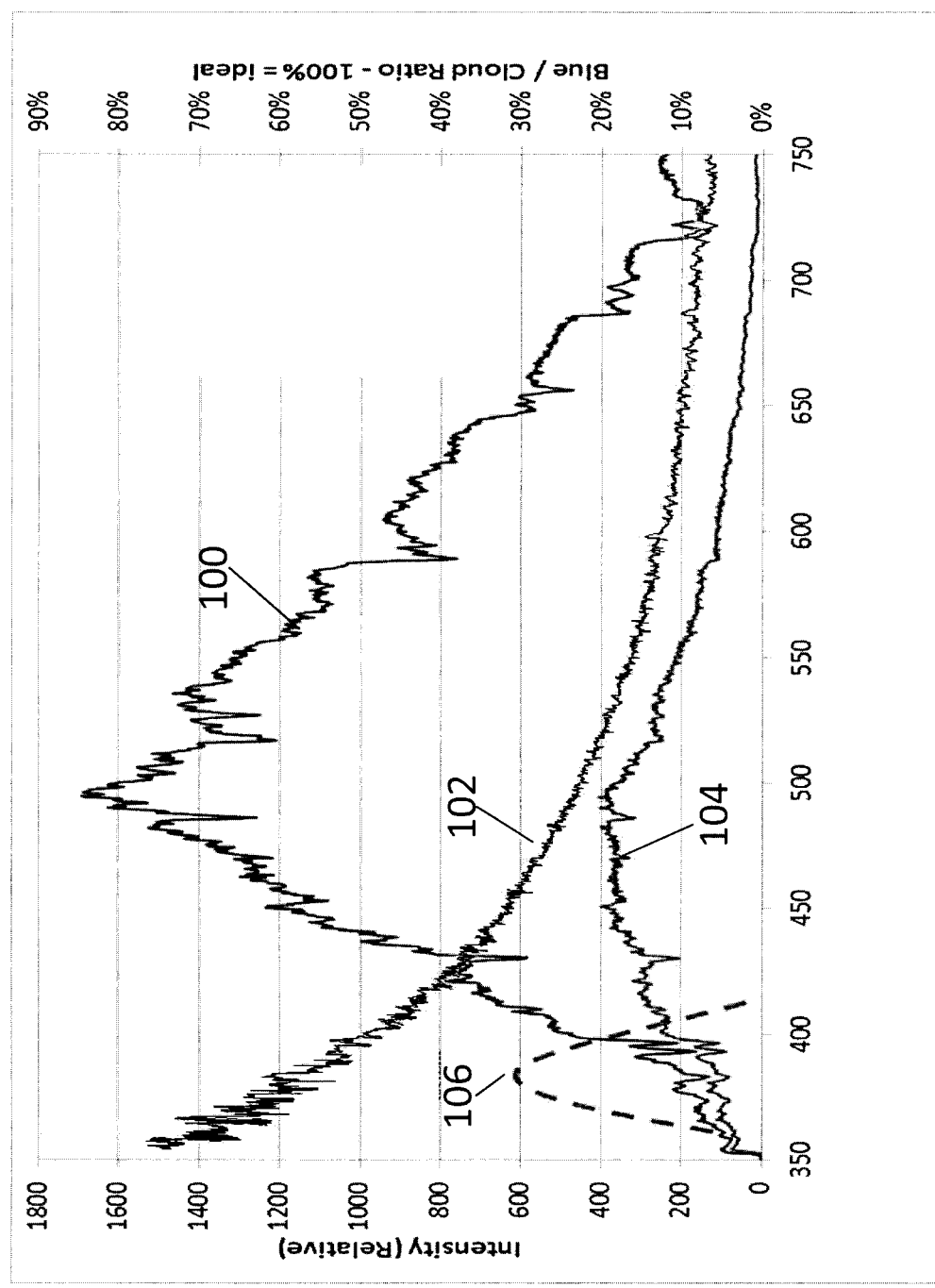
FIG. 10 is a graphical representation of spectral sensitivity of an embodiment of the optical tracker illustrated in FIG. 9.

In some embodiments, the optical tracker 24 does not include an optical transmitter, but is designed to detect a series of optical signals 38, i.e., the presence or absence of light from the sky that is selectively interrupted by the blades A or B. The optical tracker 24 can be aimed to be selectively interrupted by an initial location of the blades A or B, and then the angle can be adjusted to receive readings from the blades A or B at a certain location radially from the mast. In this embodiment, the optical tracker 24 includes one or more optical photodetectors and uses trigonometric techniques to calculate the distance from the optical tracker 24 to the certain location on the blades A or B where the optical tracker 24 is aimed. The optical signals 38 may be provided by direct and indirect (i.e., scattered) sunlight. For example, the optical signal 38 may be a combination of direct sunlight (e.g., UV, visual, and infrared wavelengths), Rayleigh scattering from atmospheric molecules (e.g., UVA, blue light, somewhat uniform across the sky), Rayleigh scattering from clouds (e.g., non-uniform blue and red wavelengths), Mie scattering (e.g., white light scattering, predominantly at angles close to the sun). FIG. 10 illustrates exemplary spectral components of the optical signals 38 that may be provided by direct and indirect sunlight.

In some embodiments, the optical photodetector(s) can be more sensitive to UV light, and relatively less sensitive to infrared and visible light. Because blade shadows are predominately within the infrared and visible wavelengths, the use of UV sensitive photodetector(s) reduces the optical interference caused by blade shadows. For example, the optical photodetector(s) can be GaP photodiodes because of their limited spectral response. Exemplary wavelengths received and converted by the optical photodetector(s) into electrical signals can be within a range from 190 nm to 550 nm.

In some embodiments, the optical photodetectors can be more sensitive to UV light, and in particular, blue wavelengths of light. Generally, blue wavelengths of light and/or shorter wavelengths of light within the UV spectrum may be more stable and less affected by cloud-cover. As such, the spectral bandwidth received by the optical photodetector(s) may be further limited (e.g., filtered) to UV light, and in particular, blue wavelengths of light. Sensitivity of the optical photodiodes to longer wavelengths (e.g., green and IR) may be reduced. For example, spectral bandwidth received by the optical photodetector(s) may be limited to within 190-550 nm with a peak at 450 nm using GaP photodiode(s). Even further, a filter may be used with the GaP photodiode(s) to further limit the spectral bandwidth to 190-420 nm, 360-550 nm, or 360-420 nm. This is in comparison to traditional silicon photodiodes having a spectral range of 160-1100 nm and a peak at 950 nm (i.e., broad wavelength sensitivity). By limiting the spectral bandwidth received by the optical photodiodes, interference from inconsistency in sky cloud cover may be reduced, especially when blades are in motion. As such, filtered optical signal may be more stable giving more precise measurements of distances, decreased measurement noise, fewer "missed" blades and/or system errors, and/or ability to track under diverse sky conditions. Elimination of wavelengths outside of a particular range (e.g., wavelengths outside of 360-420 nm) may also prevent internal thermal damage from focused sunlight.

The orientation/motion sensor 26 determines the orientation and/or motion of the optical tracker 24. One non-exclusive example of an orientation/motion sensor is the Bosch Sensortec BMX055 sensor, which is an absolute orientation sensor. The orientation/motion sensor 26 may be a very small, 9-axis sensor, consisting of a triaxial 12 bit acceleration sensor, a triaxial 16 bit, ±2000°/s gyroscope and a triaxial geomagnetic sensor. The orientation/motion sensor 26 may allow accurate measurement of angular rate, acceleration and geomagnetic fields in three perpendicular axes within one device.

Figure 4:
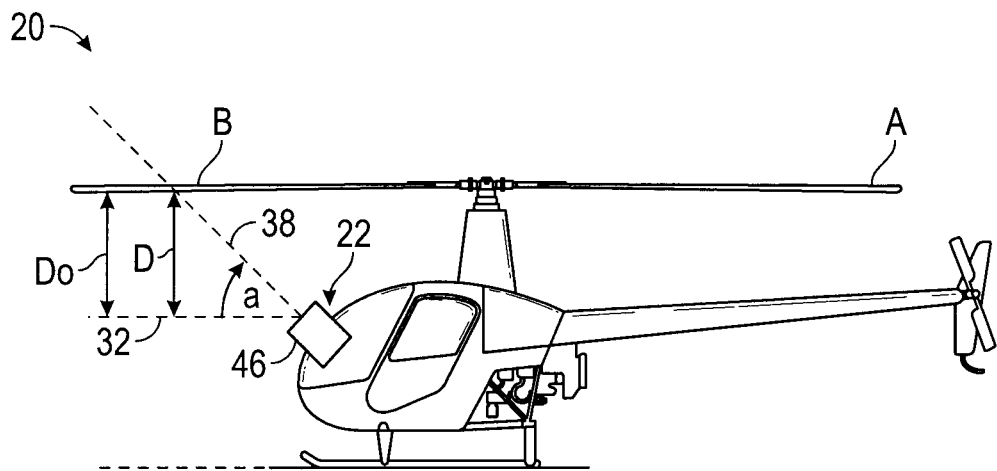
FIG. 4 is a side view of the helicopter of FIG. 2 with the exemplary tracker system having the optical tracker in accordance with the present disclosure.

As shown in FIGS. 3 and 4, by including the orientation/motion sensor 26 in the tracker system 22, the orientation/motion sensor 26 of the tracker system 22 can determine an angle 30 between the optical signal 38 generated by the optical tracker 24 and a horizontal line 32, such as the horizontal position of the tracker system 22, and one or more blade, such as Blade B. An optical tachometer 40 may be used to detect the rotor RPM. With information indicative of the angle 30, the RPM of the rotor, and the blade chord, the processor(s) 28 of the tracker system 22 can calculate the position of the optical tracker 24 relative to the rotor blades A and B. This allows the processor 28 of the tracker system 22 to then calculate the maximum deflection of the blades A and B at the rotor blades' tip, shown as measurement "D" in FIG. 4, which is the typically measured location for track error. Of course, it will be understood that, as previously explained, track error is the difference between blade distance measurements. The fixed datum in this example is the horizontal line 32, however, any fixed reference datum to the blades A and B may be used to calculate track error.

Figure 5:
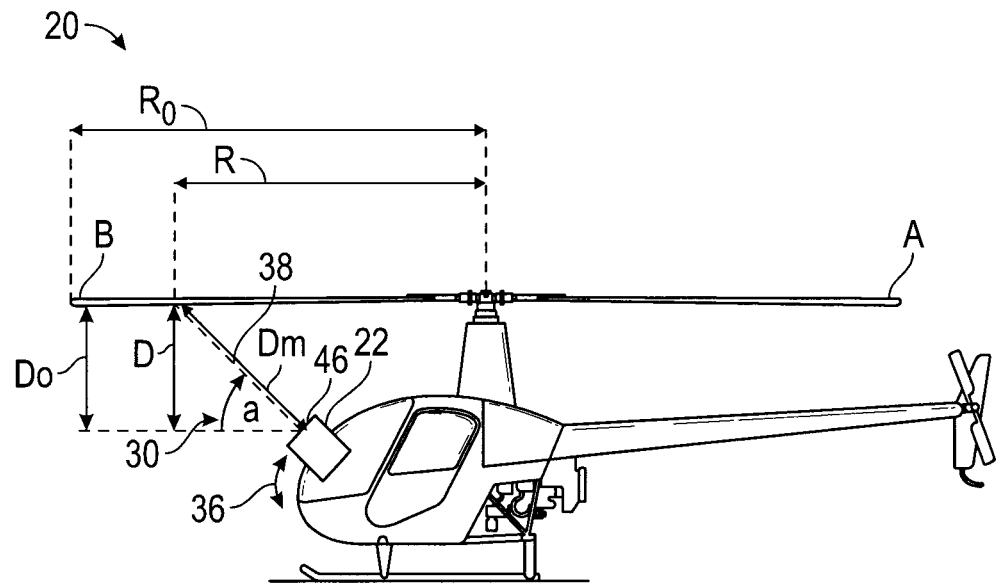
FIG. 5 is a side view of the helicopter of FIG. 2 with the exemplary tracker system having the optical tracker in accordance with the present disclosure.

FIG. 5 is an example of geometry that may be used by the tracker system 22 in calculating the track error. The track error can be calculated by taking the difference of D calculated for blade A and D calculated for blade B. D can be calculated as D=sin(a)×Dm.

FIG. 5 is also an example of calculations the tracker system 22 may use to correct for full rotor radius when a distance is used that is not from the rotor blades' tip. In this example, Do can be calculated with the following equation; Do=D×Ro/R.

By combining data from the orientation/motion sensor 26 with data from a phototachometer (RPM) 40 and the optical tracker 24, the data can be fused into a single tracker system 22 that requires very little setup time as discussed below.

As discussed above, previous systems required manual measurements and complicated setup. In contrast, as illustrated in the exemplary helicopter 20 of FIG. 5, essentially the optical tracker 24 is installed on the helicopter 20 and pointed toward the rotor blades, such as Blades A and B. The tracker system 22, with its internal orientation/motion sensor 26, is able to use trigonometric relationships to determine if the optical tracker 24 is oriented optimally outboard on the blades A or B, but missing any trim tabs. The tracker system 22 notifies the operator of any positional errors, and/or adjustments required, to complete setup. The tracker system 22 may have electronically adjustable angles, for example, by utilizing one or more servo motor 34 in the optical tracker 24 to move the optical tracker 24 and thus the direction of the optical signals 38 emitted or received by the optical tracker 24 as shown by the arrows 36 in FIG. 5. The adjustment for setup may be automated by using the servo motor 34 to position the optical tracker 24 at predefined angles. Or the servo motor 34 can be used to scan inward and outward to find blade tips. The servo motor 34 can also be used to cycle inward and outward to identify rotor anomalies such as trim tabs. Once the optimal measurement location is determined the servo motor 34 can position the tracker angle at the optimal measurement angle.

Once the rotor is in motion and the blades A or B are periodically interfering with the optical signals 38, the tracker system 22 can automatically determine the position of the optical tracker 24 based on a combination of timing measurements, orientation sensors, and data entered by the user (such as blade diameter and chord) by using trigonometric relationships.

Figure 6:
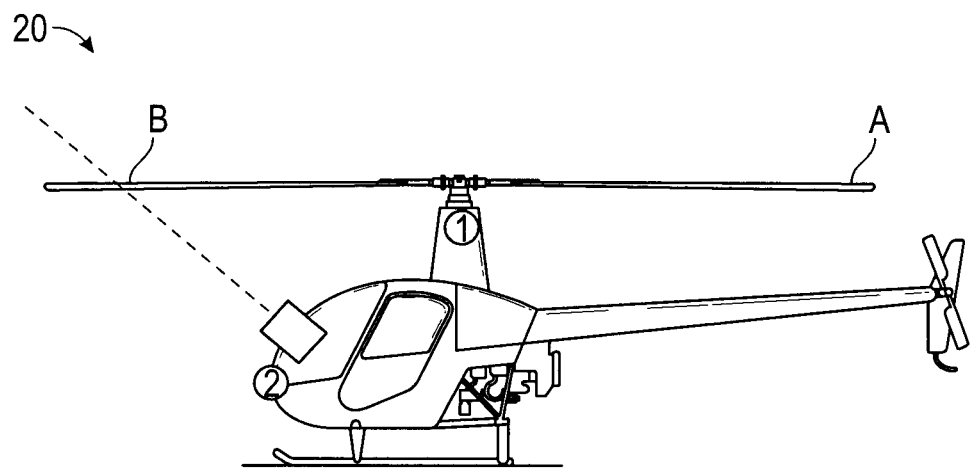
FIG. 6 is a side view of the helicopter of FIG. 2 with a conventional system for measuring vibration caused by at least one blade of the helicopter.
Figure 7:
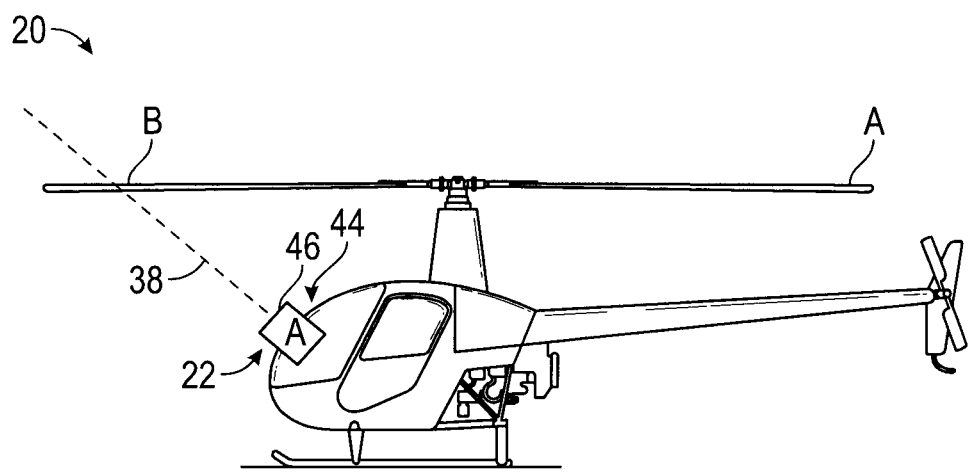
FIG. 7 is a side view of the helicopter of FIG. 2 with an exemplary tracker system in accordance with the present disclosure.

Turning now to FIGS. 6 and 7, another benefit of including the orientation/motion sensor 26 in the tracker system 22, is that the vibration profile can be determined for the entire piece of equipment, such as the aircraft vibration profile for the entire helicopter 20. As mentioned previously, current systems, an example of which is illustrated in FIG. 6, attach multiple accelerometers around the helicopter 20, as well as one at the mast 1, one at the nose 2, and then run wire back to a central computer (not shown) for analysis. These multiple accelerometers are located to maximize the translational vibration in the accelerometer.

As illustrated in FIGS. 3A and 7, in accordance with the present disclosure, the tracker system 22 may further comprise one or more six-degree-of-freedom (6-DOF) inertial measurement systems 44 capable of producing gyroscopic data that can be used to calculate the translational vibration occurring at any location on the helicopter 20. Therefore, the 6-DOF inertial measurement system 44 mounted anywhere on the helicopter 20, and/or in the tracker system 22, can calculate the vibration at any other point on the helicopter 20 by using rigid body kinematics based on predefined position vectors for each point relative to the 6-DOF sensor. This can generate "virtual" sensors on the aircraft to calculate vibration at different points. Although the inertial measurement systems 44 are described herein as 6-DOF inertial measurement systems, it should be understood that inertial measurement systems having at least one degree of freedom can be used.

The 6-DOF inertial measurement system 44 may comprise one or more accelerometer, one or more gyroscopic rotational sensor, and/or one or more multi-axis gyroscopic rotational sensor. The 6-DOF inertial measurement system 44 may be positioned with, and/or be within a same housing 46 as, the optical tracker 24 on the helicopter 20. The 6-DOF inertial measurement system 44 may also be positioned at a known distance and location relative to the 6-DOF inertial measurement system 44. The 6-DOF inertial measurement system 44 may have circuitry for determining vibration data (used in conjunction with optical blade timing data to track and balance the helicopter 20) and transmitting the vibration data to the computer processor 28. By using a multi-axis inertial measurement system 44 (velocity, acceleration, and/or gyroscopic) with the axes at a single location, vibration magnitude and phase of the vibration at "virtual" locations on the helicopter 20 can be calculated using well-known rigid body dynamics. This would make installation much simpler because fewer sensors are placed on the helicopter 20.

Of course, it will be understood that the examples above discuss the tracker system 22 in use with helicopters purely for exemplary reasons. The tracker system 22 may be used on any equipment having rotating components. Some non-exclusive examples of equipment having rotating components for which the system may be used include airplane rotors, helicopter vertical rotors, industrial fans, industrial equipment, industrial rotors, and manufacturing equipment.

Figure 8:
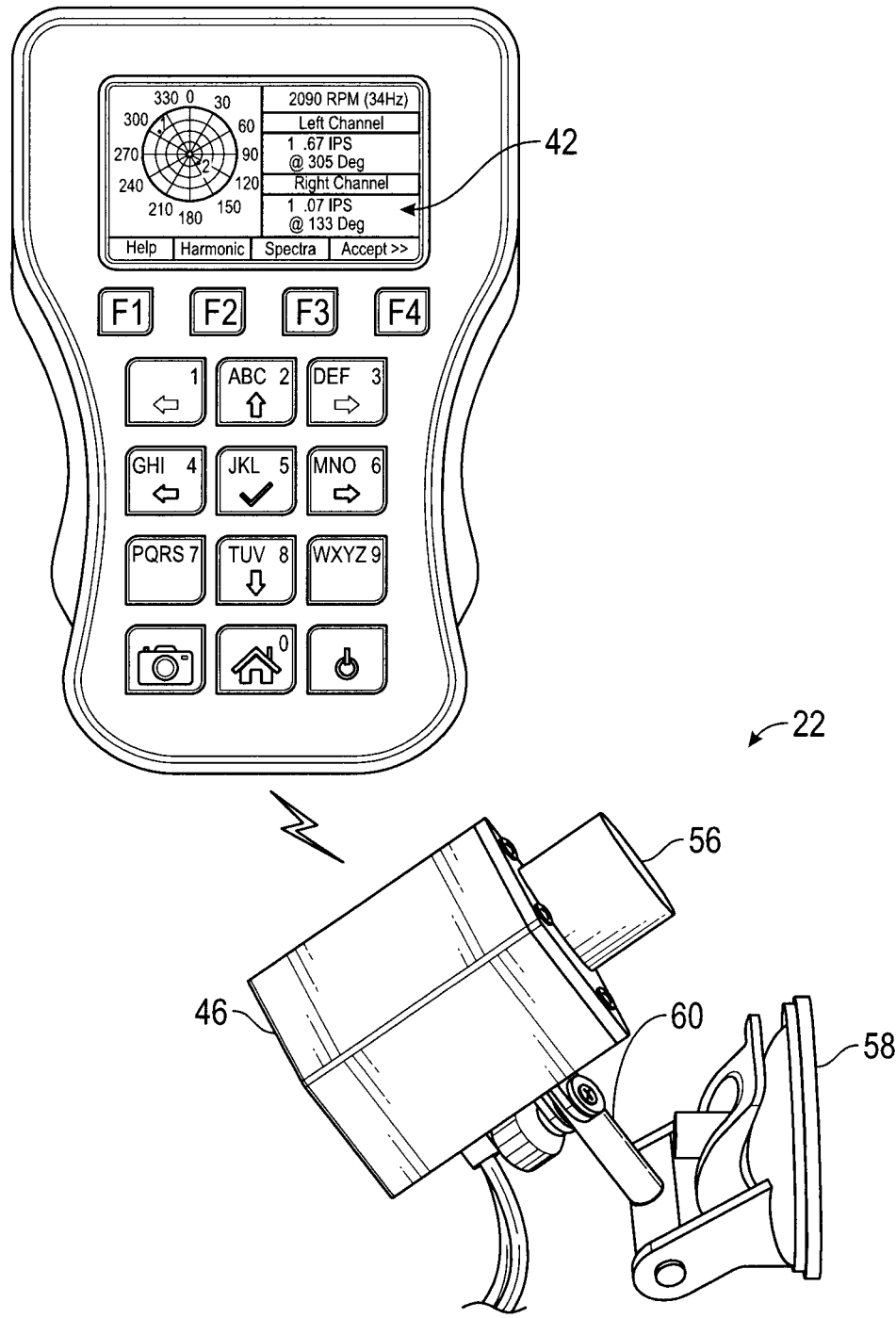
FIG. 8 is a perspective view of an exemplary embodiment of the optical tracker wirelessly communicating with a display in accordance with the present disclosure.

Shown in FIG. 8 is a perspective view of an exemplary embodiment of the tracker system 22. In general, the tracker system 22 is provided with the housing 46 that encloses and supports the optical tracker 24, the orientation/motion sensor 26, the processor(s) 28, and the inertial measurement system 44. The tachometer 40 can be outside of the housing 46 and communicate with the processor 28 using any suitable communication methodology, such as a wired or a wireless connection. Exemplary wired connections include serial connections, or parallel connections that include but are not limited to a data bus. Exemplary wireless connections include, but are not limited to, a Wi-Fi connection, a blue-tooth connection, optical connection or the like. The optical tracker 24, the orientation/motion sensor 26, and the inertial measurement system 44 may communicate with the processor 28 using a wired or a wireless connection.

As shown in FIG. 3A, in other embodiments, the tracker system 22 can be provided with one or more global positioning system 48, compass 50, or pitostatic sensor 52. The global positioning system 48 may be configured to determine and provide location data signals to the processor(s) 28. The compass 50 is an instrument that determines direction, and generates and supplies signals to the processor(s) 28 indicative of a direction that the compass 50 is facing. The pitostatic sensor 52 is a pressure sensitive instrument that determines at least one of the airspeed of the helicopter 20, the vertical speed of the helicopter 20, and an altitude of the helicopter 20 by measuring the forces acting on the helicopter 20 as a function of the temperature, density, pressure and viscosity of the atmosphere in which the helicopter 20 is operating. The pitostatic sensor 52 may include a pitot tube (not shown), a static port (not shown) and the pitot-static instruments (not shown). The pitostatic sensor 52 generates and supplies signals to the processor(s) 28 indicative of at least one of the airspeed of the helicopter 20, the vertical speed of the helicopter 20, and an altitude of the helicopter 20.

When determining and tracking the revolutions per minute and/or the track error of the blades A and B, the processor 28 can be configured to receive and record the conditions when the data was taken. The processor 28 can be configured to enable and disable the optical tracker 24, the orientation/motion sensor 26, the tachometer 40, the inertial measurement system 44, the global positioning system 48, the compass 50 and the pitostatic sensor 52 to generate data. Additional data being generated by one or more of the instruments connected to the processor(s) 28, including but not limited to the orientation/motion sensor 26, inertial measurement system 44, global positioning system 48, compass, 50 and the pitostatic sensor 52 can be logged and stored by the processor 28 in a non-transitory computer readable medium as a single reading, or a sequence of data over time, and stored with a unique identifier indicative of a particular test conducted by the tracking system 22. Exemplary additional data that can be logged by the processor(s) 28 include but are not limited to one or more GPS location signals (generated by the global positioning system 48), compass direction (generated by the compass 50), vibration data (generated by the inertial measurement system 44), Pitostatic airspeed (generated by the pitostatic sensor 52), Pitch data (generated by the inertial measurement system 44), Roll data (generated by the inertial measurement system 44), yaw data (generated by the inertial measurement system 44), revolutions per minute (generated by the tachometer 40, clock calendar (generated by the global positioning system 48).

The processor(s) 28 can also be configured to disable the optical tracker 24 from collecting data indicative of the distance from the optical tracker 24 to the blades A and B, but enable one or more of the instruments connected to the processor(s) 28, including but not limited to the orientation/motion sensor 26, tachometer 40, inertial measurement system 44, global positioning system 48, compass, 50 and the pitostatic sensor 52 to generate and provide data to the processor 28. The data can be logged and stored by the processor 28 in a non-transitory computer readable medium as a single reading, or a sequence of data over time, and stored with a unique identifier indicative of a particular test conducted by the tracking system 22. Exemplary additional data that can be logged by the processor(s) 28 include but are not limited to one or more GPS location signals (generated by the global positioning system 48), compass direction (generated by the compass 50), vibration data (generated by the inertial measurement system 44), pitostatic airspeed (generated by the pitostatic sensor 52), pitch data (generated by the inertial measurement system 44), Roll data (generated by the inertial measurement system 44), yaw data (generated by the inertial measurement system 44), revolutions per minute (generated by the tachometer 40, clock calendar (generated by the global positioning system 48).

Referring again to FIG. 8, the housing 46 can be provided with a window 56 for permitting the optical signals 38 generated by the optical tracker 24 to be transmitted outside of the housing 46, and for also permitting the reflections of the optical signals 38 from the blades A and B to pass through the window 56 and be received by the optical tracker 24. In the embodiment in which the optical tracker 24 does not generate the optical signals 38, but receives a series of optical signals 38 from the sky that are interfered with by the blades A or B, the window 56 may be constructed to pass the optical signals 38 to the optical photodetectors of the optical tracker 24.

Figure 9:
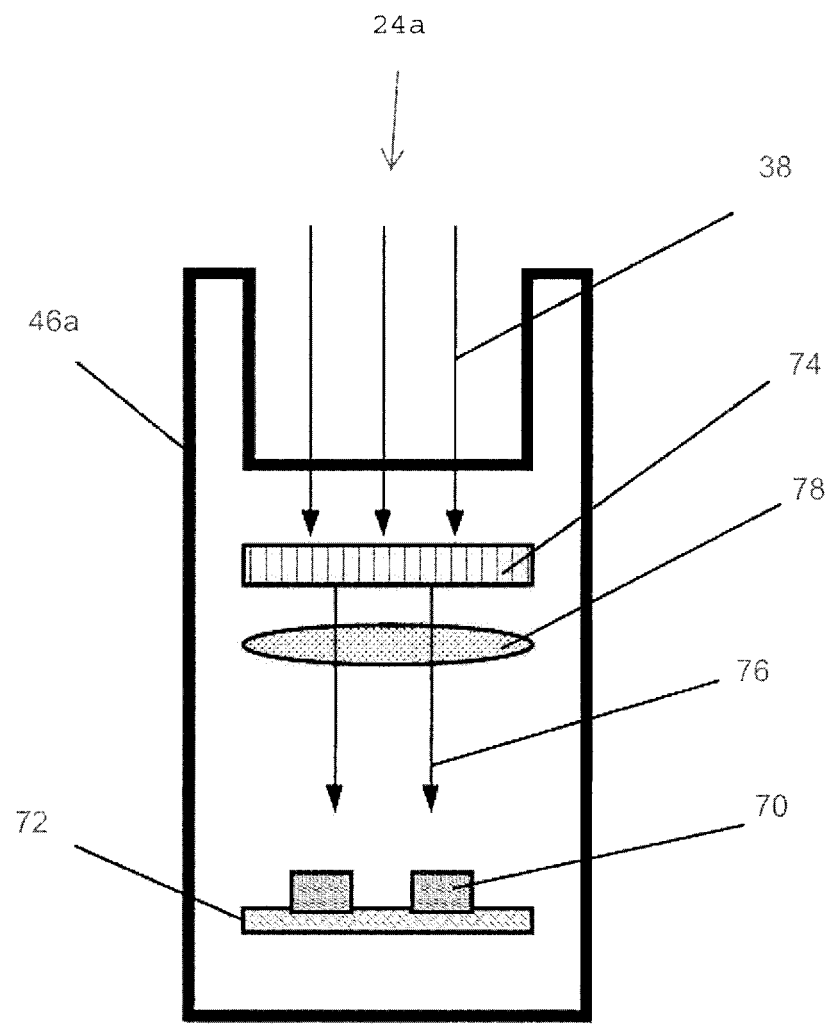
FIG. 9 is a block diagram of an exemplary optical tracker in accordance with the present disclosure.

FIG. 9 illustrates an exemplary optical tracker 24a configured to receive a series of optical signals 38 from the sky and used within the tracker system 22. Generally, the optical signals 38 from the sky may be provided by direct and indirect (e.g., scattered) sunlight, for example. The optical tracker 24a can be aimed to be selectively interrupted by an initial location of the blades A or B (shown in FIG. 3), and then the angle can be adjusted to receive readings from the blades A or B at a certain location radially from the mast. Though the optical signals 38 are depicted as parallel to one another in FIG. 9, it will be understood that the optical signals 38 may be at one or more angle and/or at one or more angle from one another.

In this embodiment, the optical tracker 24a includes one or more optical photodetectors 70 positioned within an optical tracker housing 46a on a substrate 72 (e.g., circuit board) and uses trigonometric techniques to calculate the distance from the optical tracker 24a to the certain location on the blades A or B where the optical tracker 24a is aimed. The optical tracker housing 46a may be opaque to UV light, visible light and infrared light, but may include one or more transparent and/or translucent windows to pass light from outside of the optical tracker housing 46a to the optical photodetector(s) 70. The optical photodetector(s) 70 can be more sensitive to UV light, and relatively less sensitive to infrared and visible light. Because blade shadows are predominately within the infrared and visible wavelengths, the use of UV sensitive photodetector(s) 70 may reduce the optical interference caused by blade shadows. For example, the optical photodetector(s) 70 can be GaP photodiodes because of their limited spectral response.

Referring to FIG. 9, the optical tracker housing 46a may allow for optical signals 38 to be directed through an optical filter 74 providing filtered light 76 to the optical photodetectors 70. The optical filter 74 may further limit the spectral range of the optical signals 38 entering the optical tracker housing 46a. For example, in some embodiments, the optical filter 74 may be a bandpass filter providing filtered light 76 within a range of 360-420 nm, and attenuating and/or substantially blocking optical signals 38 outside of the range as shown in FIG. 10. FIG. 10 is a graphical representation of spectral sensitivity of an embodiment of the optical tracker 24a illustrated in FIG. 9. FIG. 10, in particular, is a graph showing a relative intensity to wavelength for sun light passing through clouds and not passing through clouds. The graph of the sunlight (passing through clouds) is designated in FIG. 10 with the reference numeral 100, the sunlight (not passing through clouds—which can also be referred to as "blue sky") is designated with the reference numeral 104, and a graph of a ratio 102 between the graphs 100 and 104 is also depicted in FIG. 10. Further, a graph 106 of an exemplary optical filter 74 is also depicted in FIG. 10. As such, the filtered light 76 reaching the optical photodetectors 70 may remain in the range of 360-420 nm and only include ultraviolet light and the blue end of the visible light spectrum while blocking the remainder of the visible light spectrum and ultraviolet light. In some embodiments, one or more lenses 78 may be used within the optical tracker housing 46a to further focus the filtered light 76 to the optical photodetectors 70.

In one embodiment, the optical photodetectors 70 may be illuminated by off-axis optical signals 38. The optical filter 74 may distort the wavefront of the optical signals 38 so that an off-axis angle from the sky maps to an off-axis optical photodetector 70.

The tracker system 22 may also be provided with an attachment device 58 to permit the housing 46 to be connected to the helicopter 20. For example, the attachment device 58 may include a suction cup assembly that is connected to the housing 46 via a post 60. The one or more servo motors 34 can be linked between the housing 46, and the attachment device 58 to permit the orientation of the housing 46 to be adjusted relative to the attachment device 58. In this embodiment, the optical tracker 24 can be mounted in a stationary location/orientation within the housing 46. Alternatively, the servo motor(s) 34 can be linked to the optical tracker 24 for permitting the servo motor(s) 34 to adjust the location/orientation of the optical tracker 24 within the housing 46.

It will also be understood that the components of the tracker system 22 and/or the optical tracker 24 may be encompassed by a single enclosure, or may be individually contained, or combined in more than one enclosure in any combination.

In accordance with the present disclosure, the optical tracker 24 may transmit or utilize one or more optical signal 38 in determining the distance from the optical tracker 24 to the one or more blades A and B. The one or more optical signal 38 may be deflected by the one or more blades A and B back to the tracker system 22. The optical signal 38 may be received by the optical tracker 24, amplified and converted by the tracker system 22 into an analog signal and/or translated into a digital signal, and transmitted to a display 42 using a communication system 54. The communication system 54 can use a wired and/or a wireless connection to communicate with the display 42. The display 42 may show readouts for a user. The system may also produce one or more printed reports of results. The display 42 may indicate blade track (example: inches high or low as related to a master blade), vibration magnitude (example: inches per second) and phase (in degrees) at each measurement point. Optionally, the display 42 can show recommended adjustments to be made by a user, and needed to optimize track and balance. The display 42 may be in any format, non-exclusive examples of which include a computer screen, a monitor, a laptop display, a smart-phone, a tablet, a handheld device, a heads-up device, an in-panel device, and so on. Using the information from the report of results or the display 42, the user can make adjustments to the rotary components to correct and/or optimize the blade track and/or the balance. This can be accomplished by repositioning one or more blades and/or applying a specified weight to a rotor at one or more locations.

CONCLUSION

Conventionally, correction of displacement of rotary components of devices and vibration data and analysis require complicated setup and measurements. In accordance with the present disclosure, a consolidated tracker system 22 may comprise one or more orientation/motion sensors 26 in order to automatically calculate a variety of parameters involved in optimizing performance of the helicopter 20 including vibration or tracker error. Further, the tracker system 22 may comprise one or more accelerometers consolidated in a single housing 46 and preferably within the optical tracker 24 rather than throughout the aircraft, to reduce sensor positions and improve vibration data collection and analysis.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A tracker system mountable on a device having one or more rotary component, the tracker system comprising:
   a housing having a window;
   an optical tracker within the housing and having circuitry that causes the optical tracker to receive and generate data indicative of a distance from one or more optical signal interfered by, and received from, the one or more rotary component of the device through the window, the one or more optical signal including UV wavelengths, visible light wavelengths, and infrared wavelengths, and the optical tracker configured to be more sensitive to the UV wavelengths, than the visible light wavelengths;
   one or more computer processor having circuitry that receives and utilizes the data from the optical tracker to determine a parameter of the one or more rotary component of the device.

2. The tracker system of claim 1, further comprising a display receiving the data indicative of the parameter and displaying the data.

3. The tracker system of claim 1, further comprising one or more accelerometer located with the optical tracker, the one or more accelerometer having circuitry for determining vibration data and transmitting the vibration data to the computer processor.

4. The tracker system of claim 1, further comprising one or more gyroscopic rotational sensor located with the optical tracker, the one or more gyroscopic rotational sensor having circuitry for determining vibration data and transmitting the vibration data to the computer processor.

5. The tracker system of claim 1, further comprising one or more multi-axis gyroscopic rotational sensor located with the optical tracker, the one or more multi-axis gyroscopic rotational sensor having circuitry for determining vibration data and transmitting the vibration data to the computer processor.

6. The tracker system of claim 1, wherein the device is an aircraft and the one or more rotary component is one or more rotor having blades.

7. The tracker system of claim 1, wherein the device is an industrial fan and the one or more rotary component is one or more rotor having blades.

8. The tracker system of claim 1, wherein the device is a windmill and the one or more rotary component is one or more rotor having blades.

9. The tracker system of claim 1, wherein the optical tracker utilizes timing of optical signal transmittal and receipt to determine distance from the optical tracker to one or more rotary component of the device.

10. The tracker system of claim 1, wherein the distance is the distance from the optical tracker to one or more rotary component of the device.

11. The tracker system of claim 1, wherein the optical tracker includes optical photodetectors that are less sensitive to infrared light and visible light than ultraviolet light.

12. The tracker system of claim 1, further comprising at least one filter and an optical detector positioned within the housing with the at least one filter positioned to receive the optical signal and supply filtered light to the optical detector, the filter configured to pass UV light and to substantially block visible light and infrared light.

13. The tracker system of claim 12, wherein the at least one filter is configured to pass wavelengths of light within a range of 360-420 nm.

14. The tracker system of claim 1, wherein the optical tracker further comprises:
   an optical tracker housing constructed of a material that is opaque to UV light, visible light and infrared light, the optical tracker housing having one or more windows transparent to UV light for receiving optical signals;
   at least one optical photodetector positioned within the housing; and,
   at least one filter configured to receive the optical signals and provide filtered light including UV light and substantially not including visible light and infrared light.

15. The tracker system of claim 14, wherein the at least one filter is a band pass filter configured to pass light having a wavelength in a range of 360-420 nm to the at least one optical photodetector.

16. The tracker system of claim 14, wherein the optical tracker further comprises at least one lens configured to focus the filtered light on the at least one optical photodetector.

* * * * *